United States Patent [19]

Kim

[11] Patent Number: 5,761,287
[45] Date of Patent: Jun. 2, 1998

[54] DIGITAL KEY TELEPHONE CONNECTING APPARATUS AND METHOD IN A DIGITAL KEY TELEPHONE SYSTEM

[75] Inventor: Yang-Sun Kim, Seoul, Rep. of Korea

[73] Assignee: SamSung Electronics Co., Ltd., Suwon, Rep. of Korea

[21] Appl. No.: 541,553

[22] Filed: Oct. 10, 1995

[30] Foreign Application Priority Data

Oct. 8, 1994 [KR] Rep. of Korea ............ 1994-25803

[51] Int. Cl.$^6$ ............................................. H04M 1/00
[52] U.S. Cl. .................... 379/156; 379/171; 379/177; 370/271; 370/463
[58] Field of Search ........................ 379/156, 165, 379/164, 157, 167, 171, 177, 182, 187; 370/463, 271, 270, 524

[56] References Cited

U.S. PATENT DOCUMENTS

| 4,641,337 | 2/1987 | Tanaka et al. ............ 379/162 |
| 4,685,121 | 8/1987 | Sanglier . |
| 4,689,814 | 8/1987 | Warner, II . |
| 4,887,264 | 12/1989 | Mano et al. ............ 379/156 |
| 4,893,334 | 1/1990 | Parnello ............ 379/157 |
| 5,003,580 | 3/1991 | Duong et al. . |
| 5,063,592 | 11/1991 | Cannella et al. . |
| 5,119,418 | 6/1992 | Dupillier . |
| 5,150,402 | 9/1992 | Yamada . |
| 5,309,509 | 5/1994 | Cocklin et al. . |
| 5,349,673 | 9/1994 | Yasuda . |
| 5,420,916 | 5/1995 | Sekiguchi . |
| 5,544,158 | 8/1996 | Oprea et al. . |

FOREIGN PATENT DOCUMENTS

| 0245786 | 9/1989 | Japan .................... 379/171 |
| 0266252 | 9/1990 | Japan .................... 379/171 |
| 0309894 | 12/1990 | Japan .................... 379/171 |
| 151996 | 5/1992 | Japan .................... 379/156 |

Primary Examiner—Wing F. Chan
Assistant Examiner—Duc Nguyen
Attorney, Agent, or Firm—Robert E. Bushnell, Esq.

[57] ABSTRACT

In connecting a first digital key telephone to a second digital key telephone in a digital key telephone system, an additional connection module provides data transmission for a call between the first digital key telephone and the second digital key telephone. Synchronizing signal terminals and a B clock terminal of a transmitter of the connection module are connected to a transmitter of the first digital key telephone. Data transmission and receiving terminals, a D clock terminal and an input/output control port of a microprocessor of the first digital key telephone are also connected to the transmitter of the connection module. A transformer is connected to the second digital key telephone through a transmission line. The transformer is connected to transmission input and output terminals of the transmitter of the connection module through capacitors and diodes.

13 Claims, 4 Drawing Sheets

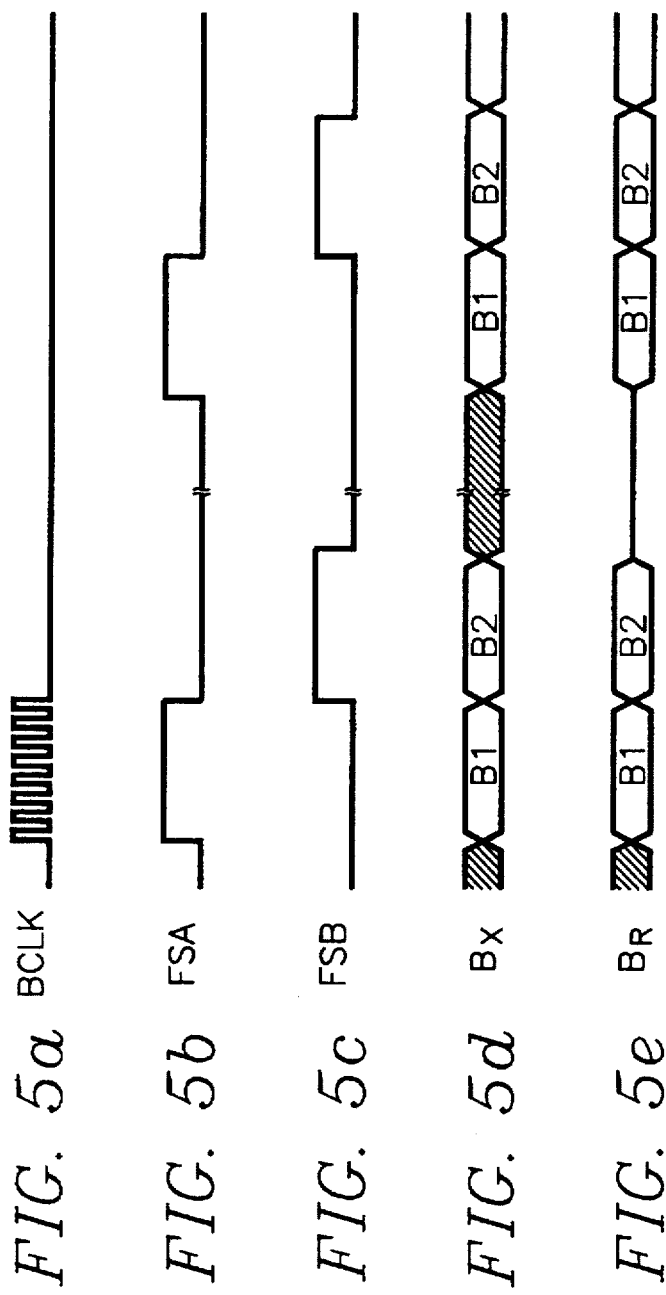

DIGITAL KEY TELEPHONE CONNECTING APPARATUS AND METHOD IN A DIGITAL KEY TELEPHONE SYSTEM

CROSS-REFERENCE TO RELATED APPLICATIONS

This application makes reference to, incorporates the same herein, and claims all benefits accruing under 35 U.S.C. §119 from an application for *Digital Key Telephone Connecting Apparatus And Method In A Digital Key Telephone System* earlier filed in the Korean Industrial Property Office on 8 Oct., 1994 and there assigned Ser. No. 25803/1994.

BACKGROUND OF THE INVENTION

The present invention relates to a method for connecting digital key telephones in a digital key telephone system, and more particularly to a method for connecting a digital key telephone to another digital key telephone by installing an additional connection module in a digital key telephone system.

With Integrated Services Digital Network (ISDN) communication techniques, B and D data channels can be used to effectively transmit data. One prior art reference exemplary of this technique is disclosed in U.S. Pat. No. 5,150,402 entitled *ISDN Terminal Having Diagnostic Function* issued to Yamada on 22 Sep., 1992. In Yamada '402, a terminal adapter section has a data rate conversion function for communication with a terminal of a distant station connected to the integrated services digital network. While Yamada '402 has merit in that its terminal adapter is capable of performing a diagnostic function to, for example, read out and change or set optional functions, I believe that it can be further improved to provide the user with a simplier and more efficient means by which to add new users to the system.

SUMMARY OF THE INVENTION

Accordingly, it is an object of the present invention to provide an improved method and apparatus for connecting digital key telephones in a digital key telephone system.

It is another object to provide a method and apparatus for connecting digital key telephones by simply installing an additional module in a digital key telephone system.

It is still another object to provide a method and apparatus for extending transmission lines in a digital key telephone system without requiring additional line work, to thereby operate a more economical system.

These and other objects can be provided according to the principles of the present invention with an apparatus for connecting a first digital key telephone to a second digital key telephone in a digital key telephone system using an additional module for providing data transmission between the first digital key telephone from the second digital key telephone. Synchronizing signal terminals and a B clock terminal of a transmitter of the additional connection module are connected to a transmitter of the first digital key telephone. Data transmission and receiving terminals, a D clock terminal and an input/output control port of a microprocessor of the first digital key telephone are also connected to the transmitter of the connection module. A transformer is connected to the second digital key telephone through a transmission line, and the transformer is connected to transmission input and output terminals of the transmitter of the connection module through capacitors and diodes.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar elements components, wherein:

FIGs. 5a–5e are operational waveform charts for B channel interfacing of FIG. 4.

DETAILED DESCRIPTION OF THE PREFERRED EMBODIMENT

Figure 1:
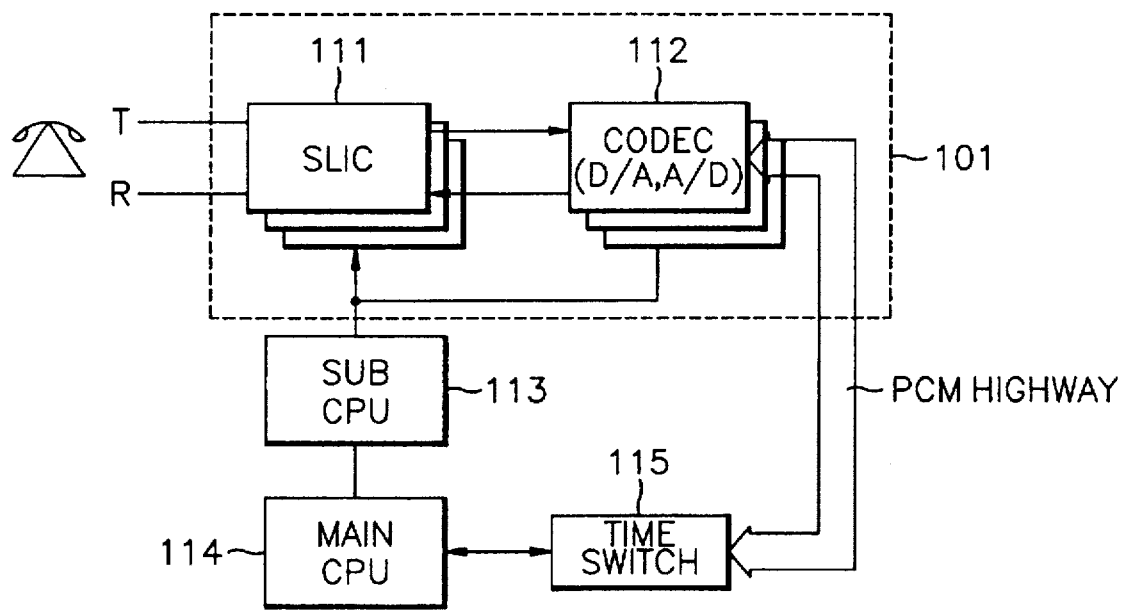
FIG. 1 illustrates a conventional digital key telephone system connecting a standard telephone.

Turning now to the drawings and referring to FIG. 1, a conventional digital key telephone system connecting a standard telephone is shown. A conventional telephone subscriber interface circuit 101 includes a codec 112 that performs a digital-to-analog (D/A) and an analog-to-digital (A/D) conversion process and a subscriber line interface circuit (SLIC) 111 connected between codec 112 and a telephone handset. A time switch 115, which transmits and receives electrical signals to and from a main central processing unit (CPU) 114, is connected to codec 112 via a pulse code modulation (PCM) highway. Subscriber line interface circuit (SLIC) 111 receives signals from main central processing unit (CPU) 114 through a sub central processing unit (CPU) 113.

Figure 2:
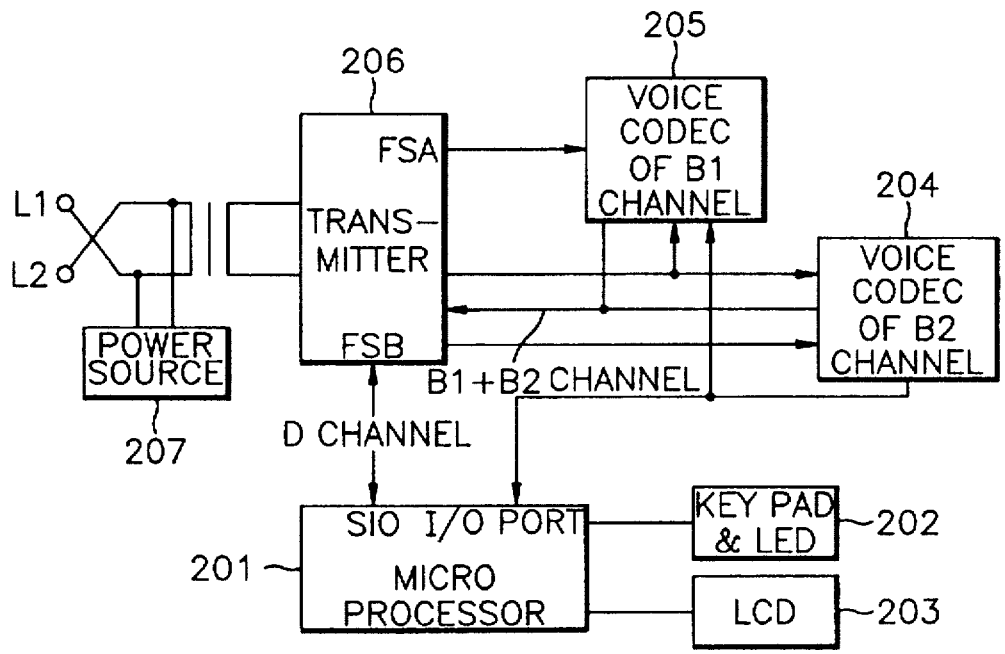
FIG. 2 is an internal block diagram of a digital key telephone system.

Recently, a time switch using a time compressed multiplexing (TCM) system has been widely used, instead of a cross point, to connect a call in a private branch exchange (PBX) or a digital key telephone system, such as the one shown in FIG. 1. The time switch has a direct effect on the line according to its capacity. In the past, a voice signal exchange function was largely utilized. With increased user demand for a variety of services, however, the necessity for data exchange is being increasingly expressed. Referring now to FIG. 2, a digital transmission system using a 2B+D structure is shown. This structure is a basic system widely used in Integrated Services Digital Network (ISDN) communication techniques and applied techniques therefor have been published.

With the 2B+D digital transmission protocol, a voice signal and data can be simultaneously transmitted and transmission speed is remarkably fast as compared to an analog system. The 2B+D designation refers to the fact that the structure is constructed with B1, B2 and D channels. In the digital key telephone system, since a data highway is allocated to the B1 and B2 channels, the B1 and B2 channels can be used without being restricted to the voice signal or data. If either the B1 or B2 channel is used, one is used for voice transmission and the other is reserved. If both the B1 and B2 channels are used, they are typically used for voice/data transmission, but they may also be used for data/data transmission or voice/voice transmission. In FIG. 2, a microprocessor 201 is connected to a key pad and light emitting diode (LED) 202 and a liquid crystal display (LCD) 203. Microprocessor 201 is further connected to a transmitter 206 via the D channel, and voice codec of B1 channel 205 and voice codec of B2 channel 204. Transmitter 206 is connected between lines L1 and L2 and voice codec of B1 channel 205 and voice codec of B2 channel 204. A power source 207 provides power to lines L1 and L2.

Figure 3:
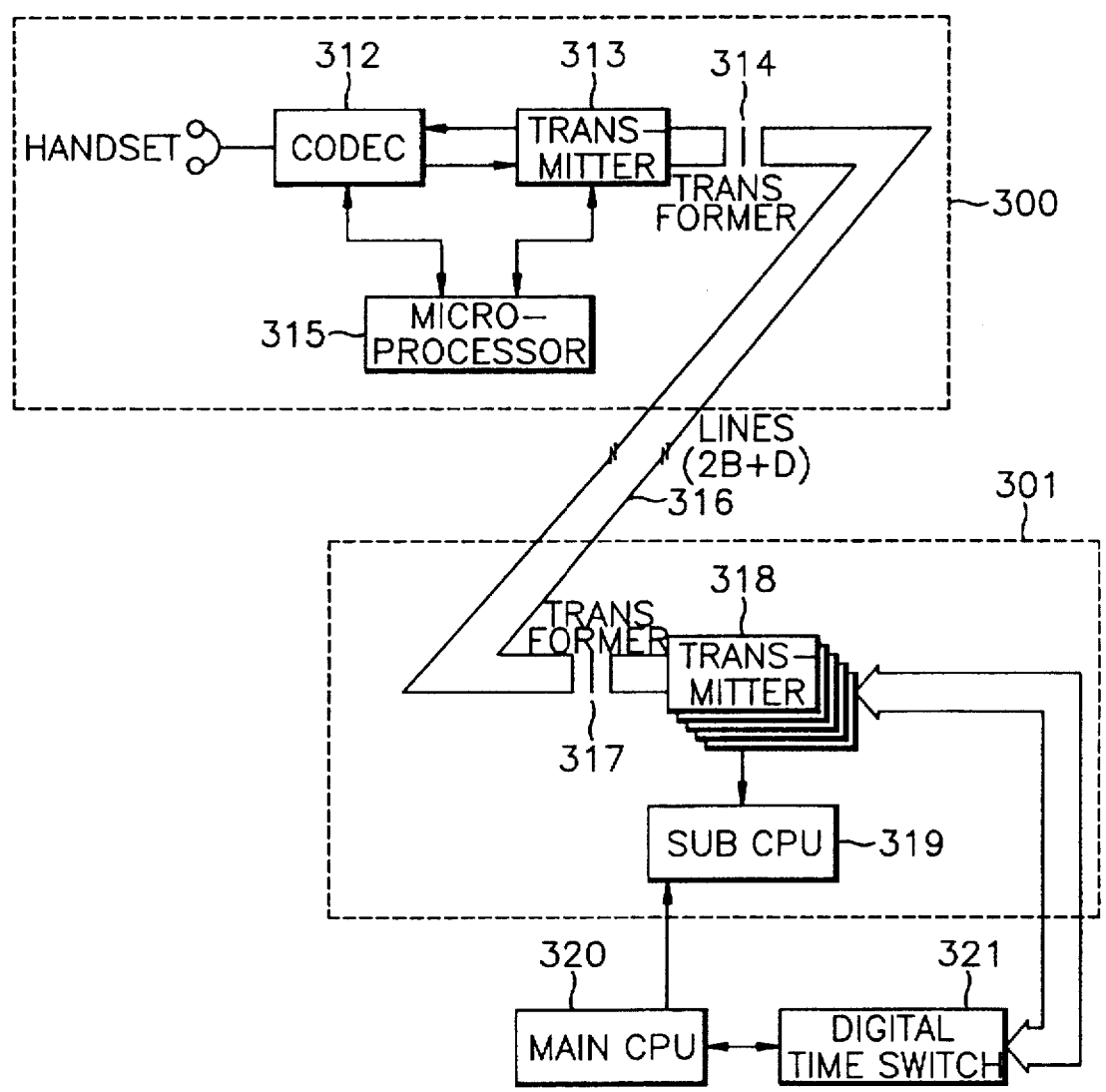
FIG. 3 is a schematic block diagram showing a connection between a digital key telephone interface circuit and a digital key telephone.

Referring now to FIG. 3, the voice/voice signal transmission using the 2B+D digital transmission system is processed in a digital key telephone 300. A transmitter 313 is operated pursuant to the control of a one-chip microprocessor 315 within digital key telephone 300. For speech processing, a codec 312 for processing a voice signal of the B1 and B2 channels allocates one B channel. Codec 312 is also connected to a telephone handset.

Transmitter 313 of the digital key telephone system shown in FIG. 3 is connected to a subscriber interface circuit 301 through a transformer 314 and two lines (2B+D) 316. A voice signal and data switched by a digital time switch 321 connected to a main central processing unit (CPU) 320 are transmitted to the digital key telephone 300 together with a power source through a transmitter 318, a transmission transformer 317 and the two lines (2B+D) 316. A sub central processing unit (CPU) 319 is connected to receive signals from transmitter 318 and main central processing unit (CPU) 320. Transmitter 313 of the digital key telephone 300 extracts a signal coded to alternate mark inversion (AMI) and separates the channel. A pulse code modulation (PCM) voice signal separated to the B1 channel is converted into an analog signal through the codec 312 within digital key telephone 300.

In the conventional 2B+D digital transmission system, there is a disadvantage, however, in that the B2 channel is restricted only within the digital key telephone, although the channel may be used for the voice signal or data transmission.

Figure 4:
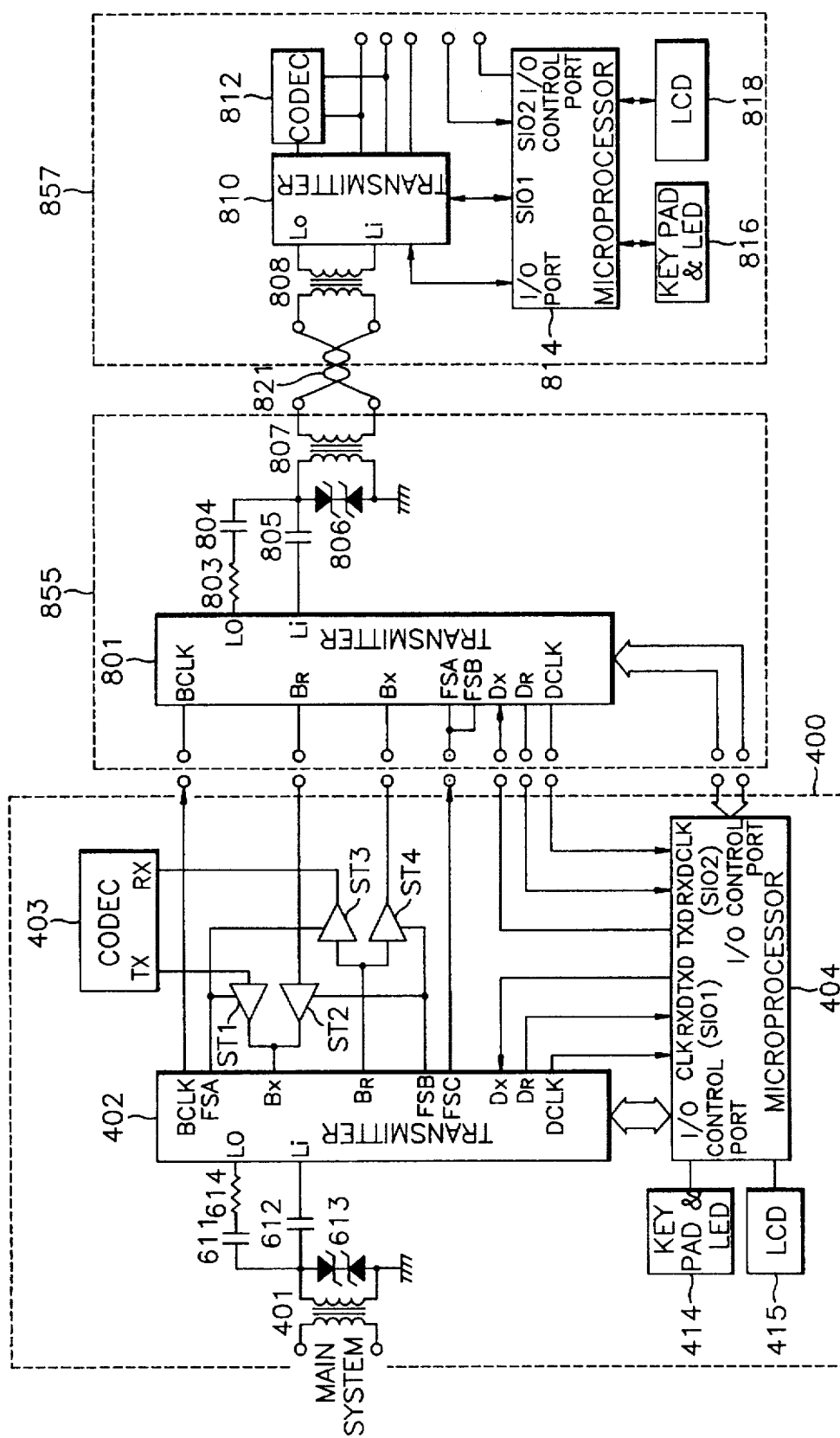
FIG. 4 is a circuit diagram showing a connection between a digital key telephone and another digital key telephone according to the principles of the present invention.

Referring now to FIG. 4, a circuit diagram showing a connection module 855 between a digital key telephone 400 and another digital key telephone 857 according to the principles of the present invention is illustrated. In FIG. 4, a transmitter 801 has the same function as transmitter 402 in a digital key telephone 400. Terminals $B_X$ and $B_R$ of the B channel of transmitter 801 are connected to the terminals $B_X$ and $B_R$ of transmitter 402 through 3-state buffers ST1-ST4, while respective BLCK terminals are connected to each other. Terminals FSA, FSB and FSC represent synchronization signal terminals. Terminals $D_X$, $D_R$ and DCLK of the D channel of transmitter 801 and transmitter 402 are connected to a microprocessor 404. Transmitting and receiving terminals Lo and Li of transmitter 402 are connected to a main system through a resistor 614 and a capacitor 611, and a capacitor 612, respectively, and through diodes 613, and a transformer 401. Transmitting and receiving terminals Lo and Li of transmitter 801 are connected to a transmitter 810 through a resistor 803 and a capacitor 804, and a capacitor 805, respectively, and through diodes 806, a transformer 807, a transmission line 821, and a transformer 808 of another digital key telephone 857. The internal configuration of digital key telephone 857 is the same as that of digital key telephone 400. That is, both digital key telephones 400 and 857 respectively include components such as codecs 403 and 812, microprocessors 404 and 814, key pads and light emitting diodes (LEDs) 414 and 816, and liquid crystal displays 415 and 818. Thus, the digital key telephone 857 can be used through the affordable B channel of digital key telephone 400. If a digital data transmission device is connected instead of digital key telephone 857, however, data transmission between digital transmission devices can be performed through the B2 channel of digital key telephone 400.

FIGS. 5a-5e illustrate B channel interfacing of transmitter 402 of FIG. 4 wherein pulse code modulation (PCM) data is conveyed to the B1 and B2 channels.

In FIG. 4, digital key telephone 400 is a master and digital key telephone 857 is a slave. The master performs alternate mark inversion (AMI) coding of the pulse code modulation (PCM) data of the B2 channel by use of transmitter 801 of connection module 855, and the coded signal is powerfed through transformer 807. That is, to use the digital key telephone 857 as the slave, the transmitter 802 of connection module 855 functions as the master corresponding to voice or data transmission. In other words, two lines are connected between the digital key telephone system and the digital key telephone. Transmitters 402 and 810 of the digital key telephones 400 and 857, respectively, and the transmitter 801 of the connection module 855 are model "TP3403" manufactured by NATIONAL SEMICONDUCTOR Co., U.S., which is a subscriber loop digital adaptor (SLDA), widely used for 2B+D interface transmission equipment in the integrated services digital network (ISDN).

In a connection between digital key telephone 400 (hereinafter, referred to as a "masterphone") and digital key telephone 857 (hereinafter, referred to as a "slavephone"), if the connection module 855 is installed to use the slavephone, transmitter 801 is initialized by a control signal generated from an input/output (I/O) control port of microprocessor 404 of the masterphone. If the slavephone is connected to the connection module 855, an interrupt signal is generated from transmitter 810 of the slavephone to adjust synchronization for the transmission of voice data between transmitter 801 of the connection module 855 and transmitter 810 of the slavephone. If the synchronization for mutual data transmission is performed, a physical link is set up from a first layer and a data link is set up from a second layer. If all the links are set up, the transmitter 801 of the connection module 855 notifies the masterphone of information about the slavephone.

Microprocessor 404 of the masterphone, which receives the information about the slavephone, informs the system through transmitter 402 that the slavephone is installed. The system transmits the information about the slavephone to the slavephone through the B channel, which is not used in the masterphone, and transmitter 801 of the connection module 855. In this case, a receiving signal of the system is not directly transmitted to the slavephone from the transmitter 402 of the masterphone. The transmitter 402 of the masterphone receives the signal from the system and converts the signal into a format transmitted thereto from the system. The transmitter 801 of the connection module 855 receives the converted signal and converts the signal into a format transmitted thereto from the system. That is, the slavephone functions as if it is directly connected to the system.

When the masterphone transmits data, since the signal of the B1 and B2 channels is transmitted through the transmitter 402 from the microprocessor 404 of the masterphone, and is switched in the transmitter 801 of the connection module 855, neither the slavephone nor the masterphone is altered in the function of the digital key telephone.

Devices with a transmitter of the same form as the digital key telephone 857 can be connected to the connection module 855. For example, liquid crystal display (LCD) telephones, basic telephones, add-on modules (AOMs which are DSS/BLF), door phone interface modules (DPIM), serial interface modules (SIMs which are modules capable of connecting a printer, a personal computer, etc.), and the like can be connected.

As described above, if there is need to extend lines in a digital key telephone system, due to user demand or an increase in the number of users, it is economically favorable to use the additional connection module of the present invention instead of a digital telephone interface board. After installing the system, the lines can be simply extended without additional line work. Moreover, since digital key telephones, add-on modules, data connection equipment, door phone connection equipment, etc. can be selectively used, a wide variety of effective system operation can be achieved.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. An apparatus for connecting a first digital key telephone to a second digital key telephone in a digital key telephone system, said apparatus comprising:

a connection module for providing data transmission between said first digital key telephone and said second digital key telephone, said connection module comprising:

a first transmitter connected to data transmission and receiving terminals, a D channel clock terminal and an input/output control port of a microprocessor of said first digital key telephone, said first transmitter including synchronizing signal terminals and a B channel clock terminal connected to a second transmitter of said first digital key telephone;

a transformer connected to said second digital key telephone through a transmission line; and capacitors and diodes connected between said transformer and transmission input and output terminals of said first transmitter.

2. A method for connecting a first digital key telephone to a second digital key telephone in a digital key telephone system, comprising the steps of:

designating said first digital key telephone directly connected to said digital key telephone system as a masterphone, and designating said second digital key telephone connectable to said first digital key telephone as a slavephone, said first and second digital key telephones being separated by a prescribed distance; and connecting transmission devices within said masterphone and said slavephone to each other via a connecting medium to enable said masterphone and said slavephone to mutually transmit data and voice signals, the connecting medium including a transmission line and a transformer connected to the slavephone through the transmission line;

wherein the transmission devices comprise a first transmitter connected to data transmission and receiving terminals, a D channel clock terminal and an input/output control port of a microprocessor of said masterphone, said first transmitter including synchronizing signal terminals and a B channel clock terminal connected to a second transmitter of said masterphone.

3. The method of claim 2, wherein the transmission devices further comprise capacitors and diodes connected between said transformer and transmission input and output terminals of a transmitter.

4. The method of claim 2, wherein the transmission devices comprise:

means for connecting input and output terminals of a transmitter to said transformer to connect said device to said slavephone and enable electrical communication between said masterphone and said slavephone.

5. The method of claim 4, wherein said connecting means comprises a resistor, first and second capacitors, and first and second diodes.

6. The method of claim 2, wherein said the transmission devices comprise a resistor, first and second capacitors, and first and second diodes.

7. A device for connecting a first digital key telephone to a second digital key telephone in a digital key telephone system, said device comprising:

a first transmitter electrically connected to receive B channel data and synchronizing signals from a second transmitter installed within said first digital key telephone, and to receive D channel data from a microprocessor installed within said first digital key telephone;

a transformer for connecting said device to said second digital key telephone via a transmission line; and means for connecting input and output terminals of said first transmitter to said transformer to connect said device to said second digital key telephone and enable electrical communication between said first digital key telephone and said second digital key telephone.

8. The device as claimed in claim 7, wherein said connecting means comprises a resistor, first and second capacitors, and first and second diodes.

9. A method for connecting a first digital key telephone to a second digital key telephone in a digital key telephone system, comprising the steps of:

designating said first digital key telephone directly connected to said digital key telephone system as a masterphone, and designating said second digital key telephone connectable to said first digital key telephone as a slavephone, said first and second digital key telephones being separated by a prescribed distance; and connecting transmission devices within said masterphone and said slavephone to each other via a connecting medium to enable said masterphone and said slavephone to mutually transmit data and voice signals, the connecting medium including a transmission line and a transformer connected to the slavephone through the transmission line;

wherein the transmission devices comprise a first transmitter electrically connected to recieve B channel data and synchronizing signals from a second transmitter installed within said masterphone, and to receive D channel data from a microprocessor installed within said slavephone.

10. The method of claim 9, wherein the transmission devices further comprise capacitors and diodes connected between said transformer and transmission input and output terminals of said first transmitter.

11. The method of claim 3, wherein the transmission devices comprise:

means for connecting input and output terminals of said first transmitter to said transformer to connect said device to said slavephone and enable electrical communication between said masterphone and said slavephone.

12. The method of claim 11, wherein said connecting means comprises a resistor, first and second capacitors, and first and second diodes.

13. An apparatus for providing electrical communication between a first digital key telephone and a second digital key telephone in a digital key telephone system, said apparatus comprising:

a first transmitter having a B channel clock port, a B channel receiving port, a B channel transmission port, a D channel clock port, a D channel receiving port, a D channel transmission port, a synchronization port, an input port and an output port, said B channel clock port electrically connected to a second transmitter installed within said first digital key telephone to receive B channel clock signals, said B channel receiving port electrically connected to said second transmitter through a first tri-state buffer to receive first B channel data from said first digital key telephone and transmit said first B channel data to said second digital key telephone via said output port, said B channel transmission port electrically connected to said second transmitter through a second tri-state buffer to transmit second B channel data received from said second digital key telephone via said input port to said first digital key telephone, said D channel clock port electrically connected to a microprocessor installed within said first digital key telephone to transmit D channel clock signals, and said D channel receiving port electrically connected to said microprocessor to receive first B channel data from said first digital key telephone and transmit said first B channel data to said second digital key telephone via said output port.

* * * * *